United States Patent [19]

Sasaki et al.

[11] Patent Number: 4,651,223
[45] Date of Patent: Mar. 17, 1987

[54] RECORDER

[75] Inventors: Takashi Sasaki, Tokyo; Kazuhiro Matsunaga, Yokohama, both of Japan

[73] Assignee: Canon Kabushiki Kaisha, Tokyo, Japan

[21] Appl. No.: 714,257

[22] Filed: Mar. 21, 1985

[30] Foreign Application Priority Data

Mar. 30, 1984 [JP] Japan ................... 59-64958

[51] Int. Cl.$^4$ .............................................. H04N 1/22
[52] U.S. Cl. .................................... 358/284; 358/296; 340/728
[58] Field of Search ................. 358/77, 280, 282, 283, 358/284, 285, 287, 293, 296; 340/728

[56] References Cited

U.S. PATENT DOCUMENTS

| | | | |
|---|---|---|---|
| 3,573,789 | 9/1971 | Sharp et al. .................... | 340/728 |
| 4,081,843 | 3/1978 | Ohano ............................ | 358/280 X |
| 4,280,143 | 7/1981 | Judd ............................... | 358/287 X |
| 4,322,750 | 3/1982 | Ford et al. ..................... | 340/728 X |
| 4,394,693 | 7/1983 | Shirley .......................... | 358/283 X |
| 4,484,231 | 11/1984 | Eguchi .......................... | 358/284 X |
| 4,528,693 | 7/1985 | Pearson et al. ................ | 358/287 X |
| 4,533,958 | 8/1985 | Herget ........................... | 358/280 |

Primary Examiner—James J. Groody
Assistant Examiner—John C. Fox
Attorney, Agent, or Firm—Fitzpatrick, Cella, Harper & Scinto

[57] ABSTRACT

A recorder has magnification changing means for producing recording pixels of different number from the number of pixels of input image data and a print unit which prints bidirectionally in a main scanning direction. The number n of input pixels in the main scanning direction and the number m of recording pixels are represented by $$n = i \cdot k + 1$$

where i and k are positive integers $$m = j \cdot k + 1$$

where j is a positive integer.

5 Claims, 6 Drawing Figures $a_1 \circ$    $\circ b_1 = a_1$    (V)

B ↑ ↓ A $\circ b_2 = \dfrac{a_1 + 3a_2}{4}$    (W)

$a_2 \circ$ $\circ b_3 = \dfrac{a_2 + a_3}{2}$    (X)

$a_3 \circ$ $\circ b_4 = \dfrac{3a_3 + a_4}{4}$    (Y)

$a_4 \circ$    $\circ b_5 = a_4$    (V)

$a_{478} \circ$    $\circ b_{637} = a_{478}$    (V)

RECORDER

BACKGROUND OF THE INVENTION

1. Field of the Invention

The present invention relates to a recorder which records an image on a record medium by recording pixels of different number from the number of input pixels.

2. Description of the Prior Art

Many methods have been proposed to produce recording pixels of different number from the number of input pixels. When recording pixels of a larger number than the number of input pixels are to be produced, it is usual to obtain density data of a recording pixel between adjacent input pixels by interpolation.

Let us assume that the number of input pixels in one scan line is 480 and that it is to be increased by a factor of 4/3 by interpolation. The number of input pixels of 480 is thus increased to the number of recording pixels, of 640. As shown in FIG. 1, the 640th recording pixel $b_{640}$ is located outside the input pixel $a_{480}$ and density data for $b_{640}$ cannot be exactly obtained.

Let us assume that the interpolation is carried out bidirectionally to record the image during forward and backward movements of a record head.

Positions b of the recording pixels by the interpolation during the forward movement are shown by ○ and positions b′ of the recording pixels during the backward movement are shown by △.

If the same interpolation is effected in both directions, the positions of the recording pixels in the forward movements and the positions of the recording pixels in the backward movement are slightly displaced from each other as shown in FIG. 1. If the data are recorded at the same positions in the scan direction, the resolution of the recorded image is lowered. If they are to be recorded at displaced positions, a complex mechanism is required for the recording unit. This leads to increase of size of apparatus and increase of cost, and the resulting image may tend to be unattractive because edges of the recorded image do not align.

SUMMARY OF THE INVENTION

It is an object of the present invention to provide a recorder which enables the same magnification in the forward recording mode and the backward recording mode.

It is another object of the present invention to provide a recorder which can produce a high quality and high resolution image.

It is other object of the present invention to provide a recorder which can produce an image having aligned edges with a simple construction.

Other objects of the present invention will be apparent from the following description of the invention taken in conjunction with the accompanying drawings.

DETAILED DESCRIPTION OF THE PREFERRED EMBODIMENTS

Figure 1:
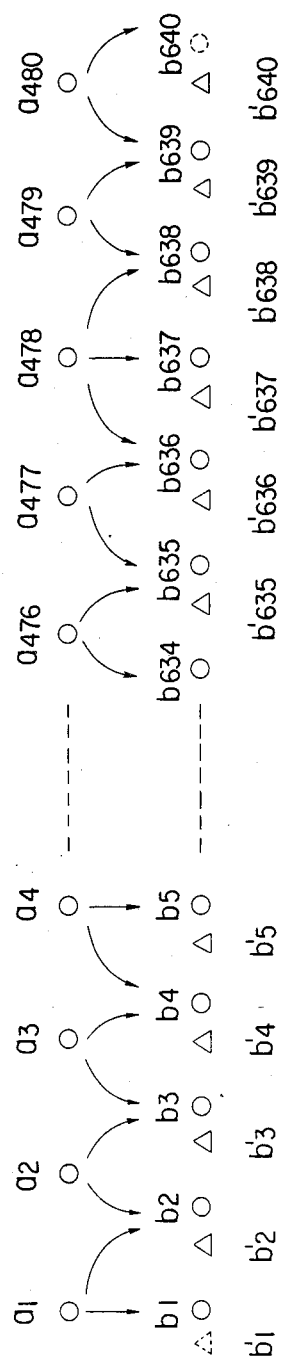
FIG. 1 illustrates 4/3 interpolation.
Figure 2:
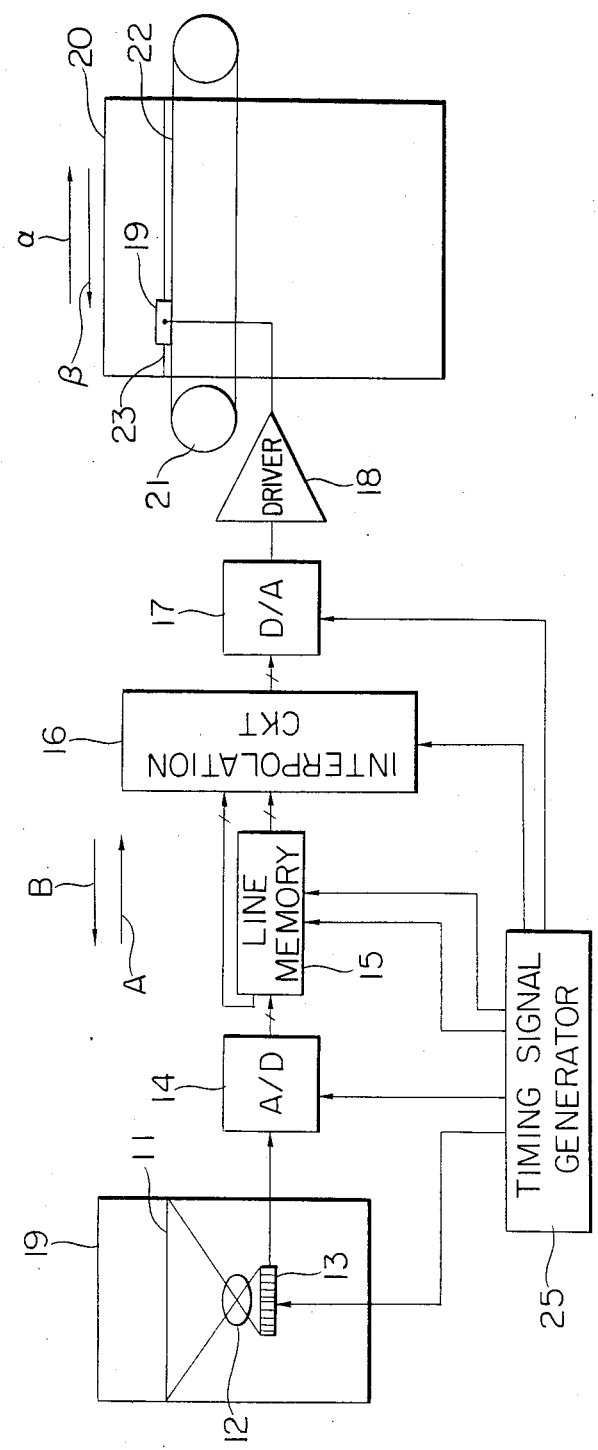
FIG. 2 is a block diagram of a read/record apparatus of the present invention.

FIG. 2 shows a block diagram of a read/record apparatus of the present invention. Numeral 10 denotes an original sheet, numeral 11 denotes a read scan line, numeral 12 denotes a focusing lens, numeral 13 denotes a reading CCD sensor, numeral 14 denotes an analog-to-digital converter (A/D converter), numeral 15 denotes a line memory, numeral 16 denotes an interpolation circuit, numeral 17 denotes a digital-to-analog converter (D/A converter), numeral 18 denotes a recording head driver, numeral 19 denotes a recording head or ink jet head, numeral 20 denotes a record paper, numeral 21 denotes a scanning roller for the head 19, numeral 22 denotes a scanning belt, numeral 23 denotes a recording main scan line and numeral 25 denotes a timing signal generator. An operation is described below.

The CCD line sensor 13 reads one line of image along the scan line 11 of the original sheet 10, and the read signal is converted to a digital signal by the A/D converter 14 and the digital signal is stored in the line memory 15. The output from the line memory 15 is interpolated by a factor of 4/3 by the interpolation circuit 16 and the output thereof is converted to an analog signal by the D/A converter 17, and the analog signal is supplied to the ink jet head 19 which controls the quantity of discharged droplet, through the driver 18. The ink jet head 19 discharges the droplet in accordance with the recording pixels data to form an image on the record paper 20. The ink jet head 19 is scanned in both directions $\alpha$ and $\beta$ by the scanning roller 21 and the scanning belt 22. The read direction (A, B) of the line memory 15 is reversed for each line in turn. When the line memory 15 is read in the direction A, the head 19 scans in the direction $\alpha$, and when the line memory 15 is read in the direction B, the head 19 is scanned in the direction $\beta$. The read direction of the line sensor 13 is constant while the record direction of the head 19 is reversed. Accordingly, the read direction of the line memory 15 is reversed to comply with the record direction.

Figure 3:
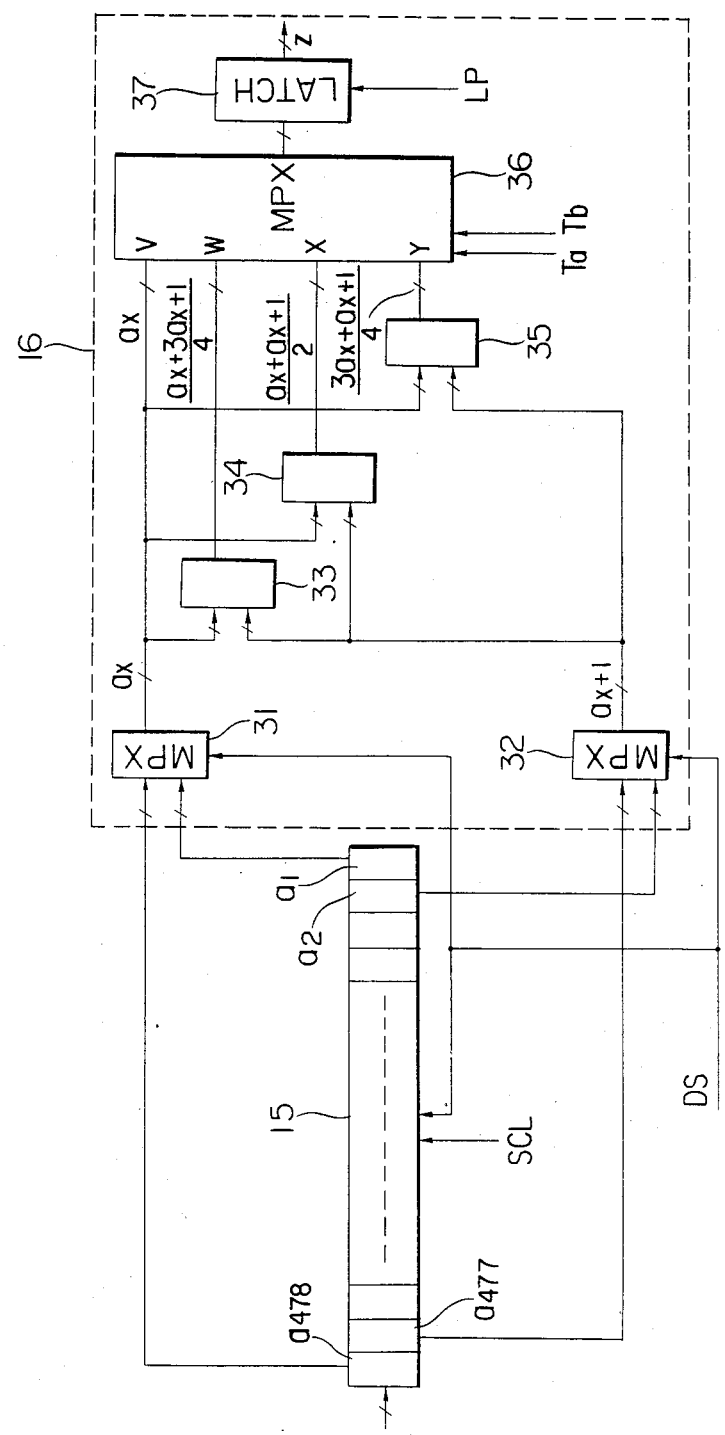
FIG. 3 is a detailed circuit diagram of a portion of FIG. 2.

FIG. 3 shows a detail of the line memory 15 and the interpolation circuit 16. The line memory 15 is a bidirectionally readable shift register and has positions $a_1$ to $a_{478}$ to store 478 input pixel digital data. The opposite end positions $a_1$ and $a_{478}$ are connected to a multiplexor 31 and the positions $a_2$ and $a_{477}$ are connected to a multiplexor 32. Accordingly, the output data from the multiplexor 32 is one pixel behind the output data from the multiplexor 31. The line memory 15 is read out by a read clock SCL and the read direction is controlled by a signal DS which indicates the recording scan direction. When it is read in the order of $a_1, a_2, \ldots$, the multiplexors 31 and 32 select lower inputs, respectively, and when it is read in the order of $a_{478}, a_{477}, \ldots$, the multiplexors 31 and 32 select the upper inputs, respectively.

The output $a_X$ of the multiplexor 31 is supplied to a multiplexor 36, and arithmetic circuits 33, 34 and 35, and the output $a_{X+1}$ of the multiplexor 32 is supplied to the arithmetic circuit 33, 34 and 35, respectively.

The arithmetic circuits 33, 34 and 35 carry out arithmetic operations of $(a_X+3a_{X+1})/4$, $(a_X+a_{X+1})/2$ and $(3a_X+a_{X+1})/4$, respectively, and the outputs therefrom are supplied to input terminals W, X and Y the multiplexor 36.

Figures 4, 5:
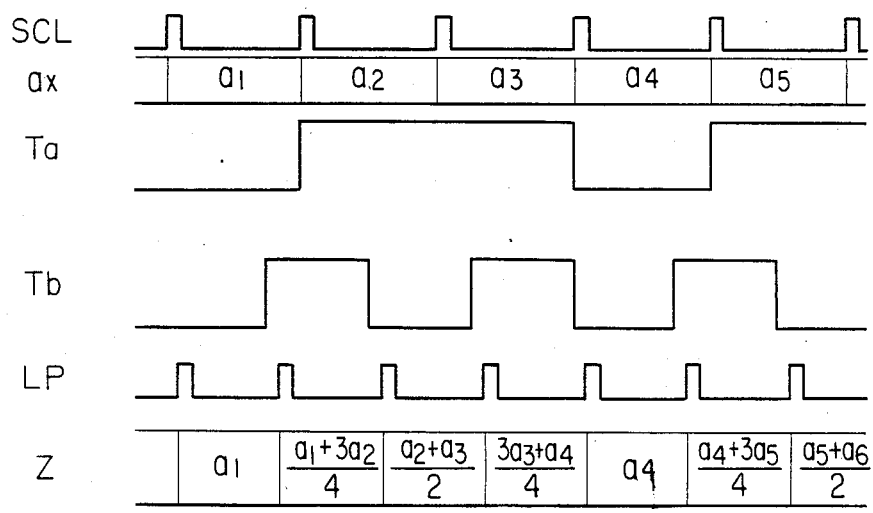
FIG. 4 illustrates an operation of the circuit of FIG. 3.
FIG. 5 shows a time chart for FIG. 3.

The multiplexor 36 is controlled by timing signals Ta and Tb shown in a timing chart of FIG. 5, and when (Ta, Tb)=(0, 0), an input terminal V is selected, when (Ta, Tb)=(0, 1) the input terminal W is selected, when (Ta, Tb)=(1, 0), the input terminal X is selected and when (Ta, Tb)=(1, 1), the input terminal Y is selected, and the output of the multiplexor 36 is latched in a latch 37, which selects the output of the multiplexor 36 by a latch pulse LP. Thus, the output of the latch 37 changes in the order of V, W, X, Y, V, W, ... as the pulse LP is applied. Accordingly, the latch 37 sequentially produces outputs as shown on the right hand of FIG. 4.

Since it was assumed that the number of input pixels to the line memory 15 is 478, the last input pixel data $a_{478}$ has one-to-one correspondence with the output pixel data $b_{637}$ when the data are read starting from $a_1$. On the other hand, when the data are read starting from a $a_{478}$, the last input pixel data $a_1$ has one-to-one correspondence with the output pixel data $b_1$.

For the 4/3 interpolation, the recording pixel data $b_{4k}$, $b_{4k-1}$, $b_{4k-2}$ and $b_{4k-3}$ are represented as follows (where k is a positive integer)

$$b_{4k} = 3a_{3k}/4 + a_{3k+1}/4 \quad (1)$$

$$b_{4k-1} = a_{3k-1}/2 + a_{3k}/2 \quad (2)$$

$$b_{4k-2} = a_{3k-2}/4 + 3a_{3k-1}/4 \quad (3)$$

$$b_{4k-3} = a_{3k-2} \quad (4)$$

When the number n of input pixels is 3k, 3k+1 or 3k+2, the last recording pixel data $b_m$ for the maximum number of recording pixels is represented as follows.

(i) n=3k

As shown in FIG. 6(i), the data up to $a_{3k}$ can be used and equation (2) is applied. Thus,
$bm = b_{4k-1} = a_{3k+1}/2 + a_{3k}/2$ (ii) n=3k+1

Figure 6:
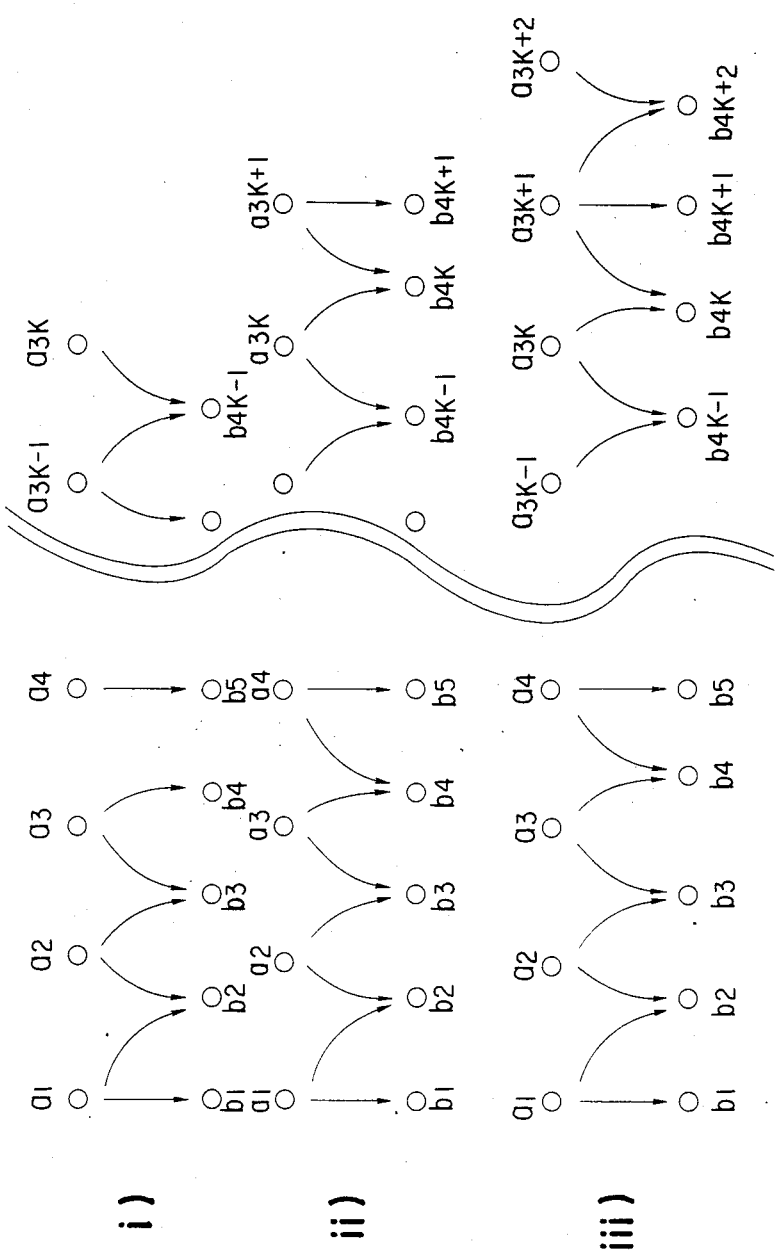
FIG. 6 shows a relationship between the number of input pixels and the number of interpolated pixels.

As shown in FIG. 6(ii), the data up to $a_{3k+1}$ can be used and the equation (4) is applied. Thus, $$bm = b_{4k(k+1)-3} = a_{3(k+1)-2} \text{ or}$$

$$bm = b_{4k+1} = a_{3k+1}$$

(iii) n=3k+2

As shown in FIG. 6(iii), the data up to $a_{3k+2}$ can be used and the equation (3) is applied. Thus, $$bm = b_{4(k+1)-2} = a_{3(k+1)-2}/4 + 3a_{3(k+1)-1}/4 \text{ or}$$

$$bm = b_{4k-2} + a_{3k+1}/4 + 3a_{3k+2}/4$$

In any case of (i), (ii) and (iii), the first recording pixel data $b_1$ corresponds to $a_1$. Accordingly, only in the case (ii), the recording pixel data are at the same position when viewed either from the first data $a_1$ or the last data $a_{3k}$, $a_{3k+1}$ or $a_{3k+2}$.

Thus only in the case (ii), the recording pixel data are at the same position in the scan direction by the same interpolation either from $a_1$ or from $a_{3k+1}$. In the present embodiment, the number 478 of input pixels is represented by $$478 = (3 \times 159) + 1$$

$$= 3k + 1$$

and the number 637 of recording pixels is represented by $$637 = (4 \times 159) + 1$$

$$= 4k + 1$$

The 4/3 interpolation has been described above. When a magnification by a factor of j/i is desired, the number n of input pixels is set to $$n = i \cdot k + 1$$

and the number m of recording pixels is set to $$m = j \cdot k + 1$$

The number n of input pixels means the actual number of input pixels used for the calculation for determining the data of the recording pixels, and a larger number of pixels may be inputted.

In the present embodiment, the order of reading the input pixels before the interpolation is reversed in the forward movement and the backward movement. Alternatively, the order of reading the recording pixels after the interpolation may be reversed.

In the present embodiment, the original image is copied. The present invention can also be applied to a video printer which samples video signals and prints them.

As described hereinabove, in accordance with the present invention, the recording pixel data are at the same position in the main scan direction both in the forward movement and in the backward movement, and a high resolution image with edges thereof aligned can be produced without requiring a complex scan mechanism. Further the same magnification is obtained in the forward movement and the backward movement and hence the circuit is simplified.

The present invention is not restricted to the illustrated embodiment but various modifications can be made within the scope of the appended claims.

What we claim is:

1. A recorder, comprising:
    means for producing recording pixels of a different number from the number of pixels of input image data;
    reciprocation means for reciprocally moving in a main scan direction; and
    means provided on said reciprocation means for recording data on a record medium both in a forward movement and in a backward movement of said reciprocation means, wherein the number n of effective input pixels and the number m of recording pixels in the main scan direction are respectively set to $$n = i \cdot k + 1$$

$$m = j \cdot k + 1$$

where i, j and k are positive integers.

2. A recorder according to claim 1, further comprising control means for reversing the order of reading the input pixels or the recording pixels respectively in the main scan direction in accordance with the forward movement and the backward movement of said reciprocation means.

3. A recorder according to claim 2, wherein said means for producing the recording pixels receives the input pixels not inverted and inverted by said control means.

4. A recorder according to claim 2, wherein said control means includes a bidirectionally readable shift register.

5. A recorder according to claim 1, wherein said record means includes an ink jet head.

* * * * *